(12) United States Patent
Koch

(10) Patent No.: US 10,739,279 B2
(45) Date of Patent: Aug. 11, 2020

(54) METHOD FOR CHECKING THE LOCATION OF ELEMENTS IN A TIRE IN AN X-RAY INSPECTION SYSTEM, X-RAY INSPECTION SYSTEM FOR CARRYING OUT SUCH A METHOD AS WELL AS USE OF SUCH AN X-RAY INSPECTION SYSTEM FOR CARRYING OUT SUCH METHOD

(71) Applicant: YXLON INTERNATIONAL GMBH, Hamburg (DE)

(72) Inventor: Karsten Koch, Ammersbek (DE)

(73) Assignee: YXLON INTERNATIONAL GMBH, Hamburg (DE)

( * ) Notice: Subject to any disclaimer, the term of this patent is extended or adjusted under 35 U.S.C. 154(b) by 104 days.

(21) Appl. No.: 15/963,657

(22) Filed: Apr. 26, 2018

(65) Prior Publication Data

US 2018/0313771 A1    Nov. 1, 2018

(30) Foreign Application Priority Data

Apr. 26, 2017 (DE) .......................... 10 2017 108 993

(51) Int. Cl.
*G01N 23/04* (2018.01)
*G01N 23/18* (2018.01)

(52) U.S. Cl.
CPC ........... *G01N 23/04* (2013.01); *G01N 23/185* (2013.01); *G01N 2223/627* (2013.01); *G01N 2223/646* (2013.01)

(58) Field of Classification Search
CPC ...... G01N 23/00; G01N 23/04; G01N 23/083; G01N 23/185; G01N 23/18;
(Continued)

(56) References Cited

U.S. PATENT DOCUMENTS 5,737,383 A * 4/1998 Noda ................ G01M 17/028
378/57
9,772,259 B2   9/2017 Melchert et al.
2010/0220910 A1   9/2010 Kaucic et al.

FOREIGN PATENT DOCUMENTS

DE    102012213244 A1    1/2014

OTHER PUBLICATIONS

German Examination Report for DE 10 2018 109097.8; dated Jun. 18, 2018.

* cited by examiner

*Primary Examiner* — Jurie Yun
(74) *Attorney, Agent, or Firm* — Abelman, Frayne & Schwab

(57) ABSTRACT

A method for checking the location of elements in a tire in an X-ray inspection system. The X-ray inspection system has an X-ray tube, a linear X-ray detector and a manipulator. The method includes: using a three-dimensional model of the tire, in which potential locations of the elements in the tire are described; recording two-dimensional X-ray line images of the tire elements consisting of pixels, which are described by a vector from the X-ray tube through the element to the X-ray detector; allocation of the pixels of an element from the two-dimensional X-ray line image to the three-dimensional model of the tire, in that the intersection point of a straight line through the X-ray tube with the vector of the pixel from the two-dimensional X-ray line image is assigned with the potential location of the element of the three-dimensional model as a point in the space for the pixel.

7 Claims, 5 Drawing Sheets

(58) Field of Classification Search
CPC ....... G01N 2223/646; G01N 2223/627; G01N 2223/6466
USPC .......................................................... 378/61
See application file for complete search history.

METHOD FOR CHECKING THE LOCATION OF ELEMENTS IN A TIRE IN AN X-RAY INSPECTION SYSTEM, X-RAY INSPECTION SYSTEM FOR CARRYING OUT SUCH A METHOD AS WELL AS USE OF SUCH AN X-RAY INSPECTION SYSTEM FOR CARRYING OUT SUCH METHOD

CROSS-REFERENCE TO RELATED APPLICATIONS

This application is related to and claims priority under 35 U.S.C. § 119(a) to German patent application No. 102017108993.4, filed Apr. 26, 2017, the contents of which are incorporated by reference herein in its entirety.

FIELD OF THE INVENTION

The present invention relates to a method for checking the location of elements of a tire, in particular of cords or belts in a tire of a particular tire type, in an X-ray inspection system. It also relates to such an X-ray inspection system as well as the use of such an X-ray inspection system for carrying out such a method.

BACKGROUND OF THE INVENTION

Tires are reinforced with belts or cords made of metal, above all in the area of the tread. In order to check whether these belts or cords are correctly inlaid, the tires are X-rayed for checking with X-rays in order to visualize the belts or cords located in the tires and the images thereby obtained are evaluated in order to identify deviations from a desired standard.

In the X-ray inspection of radial and diagonal tires, the X-ray line images are produced by means of a wide-angle X-ray tube and a U-shaped X-ray detector array. Typically, in a line the tire is to be viewed from bead core to bead core. While the tire rotates, individual lines are recorded. These are referred to as X-ray line images in the context of the present application. These are then put together to form an overall image that depicts the whole tire.

There are two basic problems with this type of image acquisition. Through the projection of a three-dimensional object onto a two-dimensional X-ray line image, on the one hand items of location or depth information are lost in the beam direction and on the other hand, because of the complex imaging geometry, items of position and distance information cannot be directly determined as physical variables in the X-ray line image.

An essential inspection criterion in the X-ray inspection of tires is assessment of the location of the different tire components with respect to each other, in particular of the steel belts or the cords of which the steel belts consist. For example, the distance between two belt edges must not lie outside a predefined tolerance range. Tolerance ranges of this type are generally specified as physical variables and usually contain an accurate definition of the measurement points to be selected. Because of the problems mentioned, neither a free selection of the measurement points nor a direct assessment of the location is possible.

In a valuable contribution to the state of the art, DE 10 2013 001 456 B3 describes a method for calibrating an X-ray inspection system for a tire type. The items of position information on tire components are first determined automatically or manually in the form of image coordinates in the X-ray line image and then converted to physical variables by means of a tire-type-specific geometric calibration. A geometric calibration assigns to each detector pixel a physical height and width in the X-rayed object. The distance between two measurement points defined in the X-ray line image results from the combination of the pixel heights and widths along a path between the measurement points. The measurement points cannot be freely selected but implicitly lie in the calibration plane. For example, a determination of the horizontal distance between two tire components in relation to a radial section is thereby not possible or is affected by a systematic deviation.

SUMMARY OF THE INVENTION

An object of the present invention is therefore to avoid the above-named disadvantages from the state of the art.

This object is achieved according to the invention by a method with the features of claim 1. Advantageous embodiments are specified in the dependent claims.

According to these, the object is achieved by a method for checking the location of elements in a tire of a tire type in an X-ray inspection system, wherein the X-ray inspection system has an X-ray tube, a linear X-ray detector and a manipulator and comprises the following steps: using a three-dimensional model of the tire of the tire type, in which the potential locations of the elements in the tire are described; recording two-dimensional X-ray line images of the elements of the tire consisting of pixels, which are described by a vector from the X-ray tube through the element to the X-ray detector; allocation of the pixels of an element from the two-dimensional X-ray line image to the three-dimensional model of the tire, in that the intersection point of a straight line through the X-ray tube with the vector of the pixel from the two-dimensional X-ray line image is assigned with the potential location of the element of the three-dimensional model as a point in the space for the pixel.

An advantageous development of the invention provides that a measurement of the distance between two of the named points is then effected in the space of the element in the three-dimensional space of the model of the tire along any desired measurement section. Measurement sections can thereby also be realized outside a calibration plane, for example the vertical distance between the end of the ply turn-up and the end of the chafer.

The measurement section preferably runs along the cross-section of a belt ply of the tire or horizontally in the cross-section of the tire. The first alternative allows the design-dependent different curvature of the individual belt plies to be taken into account in the determination of the belt width, with the result that an improvement in the measurement accuracy is made possible through a reduction in the systematic measurement error. The second alternative makes it possible to measure particularly accurately the horizontal distance between the ends of two consecutive belt plies in relation to the tire cross-section.

A further advantageous development of the invention provides that the elements are cords of a belt. This results in an improvement in accuracy for determining the paired distances between the belt cords.

A further advantageous development of the invention provides that the potential location of the elements in the three-dimensional model of the tire also describes the location of the elements in the case of potential displacements of the elements extrapolated in both directions.

A further advantageous development of the invention provides that the recording of the two-dimensional X-ray line images of the elements of the tire is effected in several positions of the tire, into which the tire is brought with the manipulator.

The object is also achieved by an X-ray inspection system with the features of claim 7. This is an X-ray inspection system with an X-ray tube, a linear X-ray detector and a manipulator, further having a control device, which is equipped to carry out a method for checking the location of elements in a tire according to one of the preceding claims.

The object is also achieved by the use of an above-named tire inspection system for carrying out a method according to the invention, as described above together with developments thereof.

BRIEF DESCRIPTION OF THE DRAWINGS

Further details and advantages of the invention are now to be explained in more detail with reference to an embodiment example represented in the drawings.

There are shown in.

DETAILED DESCRIPTION OF THE INVENTION

Figure 1:
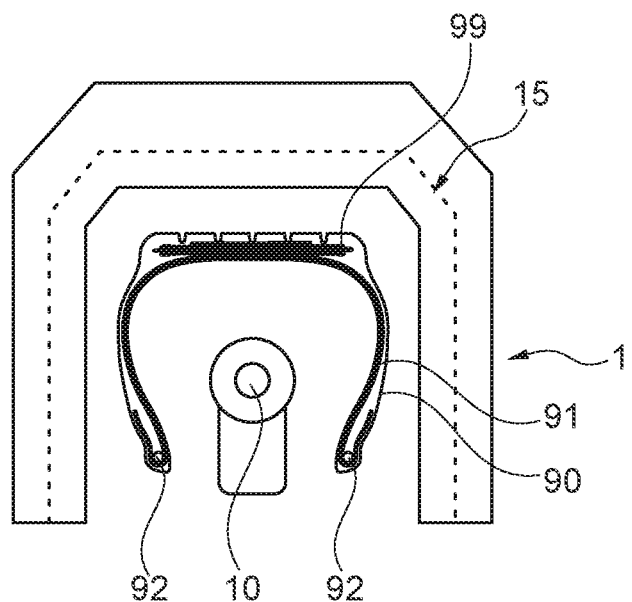
FIG. 1—a schematic imaging geometry in the tire inspection.

FIG. 1 schematically represents an X-ray inspection system 1, by means of which an X-ray inspection of tires 90, in particular of radial and diagonal tires, is effected. Here, X-ray line images are produced by means of an X-ray tube 10, in particular a wide-angle X-ray tube, and an X-ray detector 15, in particular a U-shaped X-ray detector array. While the tire 90 rotates, individual lines are recorded. These are then combined to form an overall image that depicts the whole tire 90. Typically, in a line of the whole overall image the tire 90 is to be viewed from bead core 92 to bead core 92 together with the carcass 91.

There are two basic problems with this type of image acquisition. Through the projection of a three-dimensional object onto a two-dimensional X-ray line image, on the one hand items of location or depth information are lost in the beam direction, i.e. along the beams referred to as vectors 35 in this application (see FIGS. 3 and 4), and on the other hand, because of the complex imaging geometry, items of position and distance information cannot be directly determined as physical variables in the X-ray line image.

Figure 2:
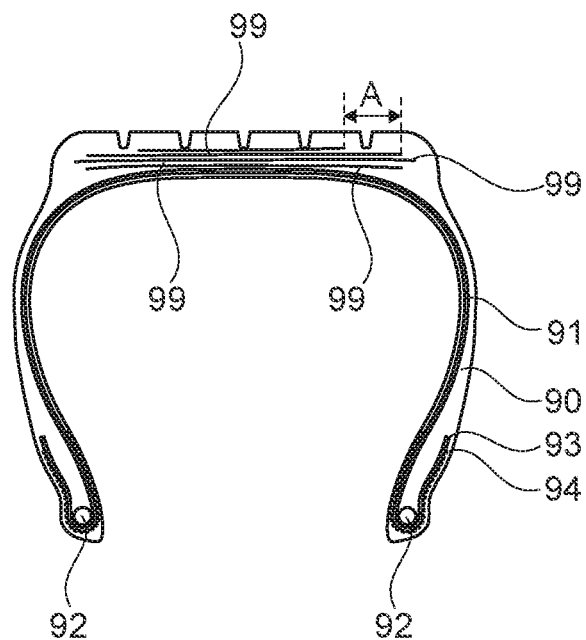
FIG. 2—a schematic representation of a measurement specification for assessing the location of two belts or of the measurement of the distance between the ends of a ply turn-up and a chafer, FIG. 3—a schematic projection of different measurement objects onto a detector array and the calibration plane, FIG. 4—a schematic representation of the systematic measurement deviation, FIG. 5—a parameterization of a model component, FIG. 6—a cross-section through a tire model and an extended tire model, and FIG. 7—a tire model and an imaging model.

FIG. 2 shows a cross-section, comparable to FIG. 1, through a tire 90 (without the X-ray system 1). An essential inspection criterion in the X-ray inspection of tires 90 is assessment of the location of the different tire components, here in the form of plies of cords 99 (which are generally referred to as elements 99 in the context of this application), with respect to each other; these are in particular steel belts which consist of cords 99. The true value of the horizontal distance A between the ends of the belt edges is of interest. Further inspection criteria are for example the width of the individual steel belts or the vertical distance between the end of the ply turn-up 93 and the end of the chafer 94. Such inspection criteria generally consist of a definition of the measurement points to be selected as well as a tolerance range for the measured variable.

Figure 3:
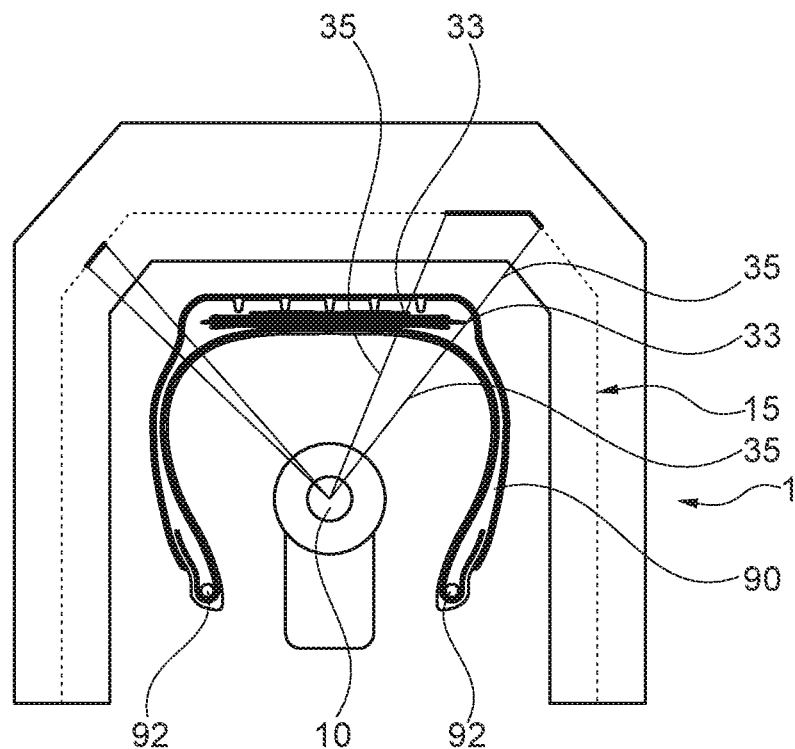
Figure 4:
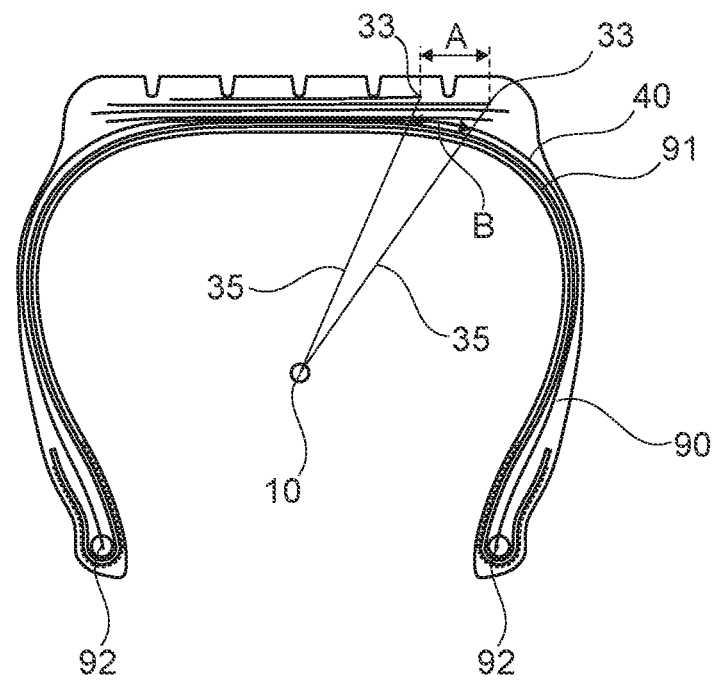

Because of the problems mentioned, in the methods currently to be found in the application, neither a free selection of the measurement points nor a direct assessment of the location is possible; as illustrated in FIGS. 3 and 4.

FIG. 3 schematically represents the basis on which the items of position information on tire components are first determined in the X-ray inspection system 1 automatically or manually in the form of image coordinates in the X-ray line image and then converted to physical variables by means of a tire type-specific geometric calibration. A geometric calibration assigns to each pixel 33 (detector pixel) in the X-ray detector 15 along a vector 35 (beam of the X-ray tube 10) a physical height and width in the X-rayed object, here the tire 90. The distance between two measurement points defined in the X-ray line image results from the combination of the pixel heights and widths along a path between the measurement points. The measurement points cannot be freely selected but implicitly lie in the calibration plane 40 (see FIG. 4).

FIG. 4 shows how, for example, a determination of the horizontal distance between two tire components in relation to a radial section is not possible or is affected by a systematic deviation. The systematic measurement deviation depends on the form of the calibration plane 40 and on the imaging geometry. On the one side there is the horizontal distance B obtained in the calibration plane 40, acquired by means of calibration, and on the other side the true value of the horizontal distance A.

In the following, a method according to the invention, solving the above-mentioned problems, is presented. This is based on a model of a tire type which contains the idealized position of the tire components in the space. The model of a tire component k represents a two-dimensional surface in the three-dimensional space, rotation-symmetric with respect to the axis of rotation of the tire 90; it can thus be understood as a function $$f_k: (\alpha, t) \in [0°, 360°) \times [t_{k,0}, t_{k,1}] \to (x, r, \alpha) \in$$
$$(-\infty, \infty) \times [0, \infty) \times [0°, 360°) \text{ with } 0 \leq t_{k,0} \leq t_{k,1} \leq 1$$

Figure 5:
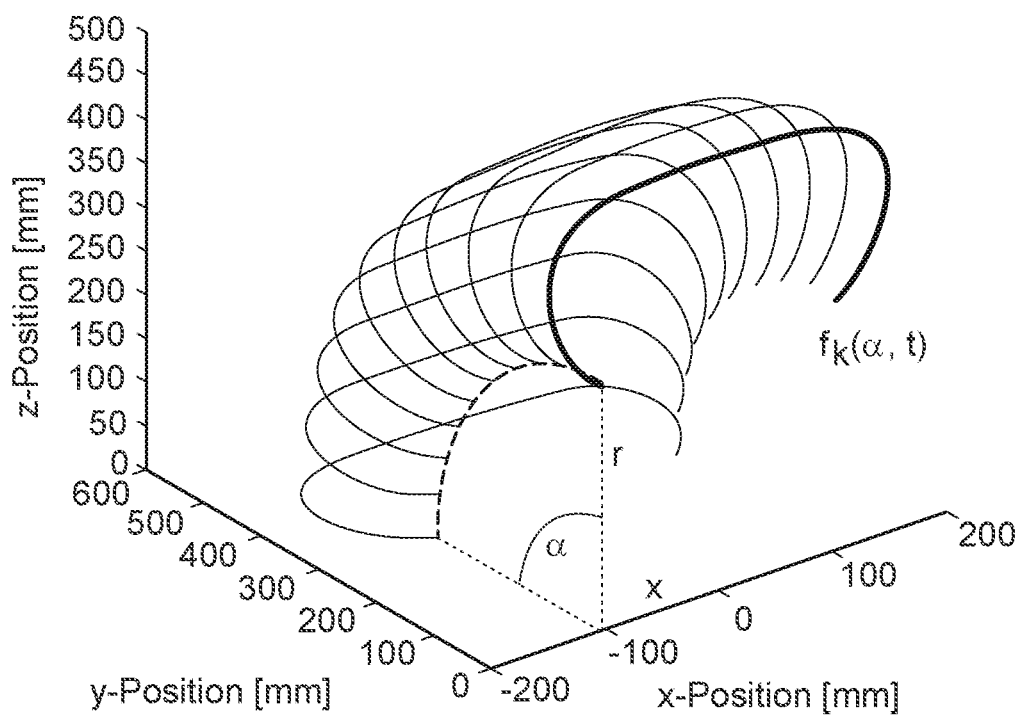

As shown in FIG. 5, a cylindrical coordinate system is used. Because of the rotation symmetry of a tire 90, the consideration of a two-dimensional model which represents the cross-section of the tire 90 is sufficient. The parameter α in the above representation can therefore be omitted for the time being.

Figure 6:
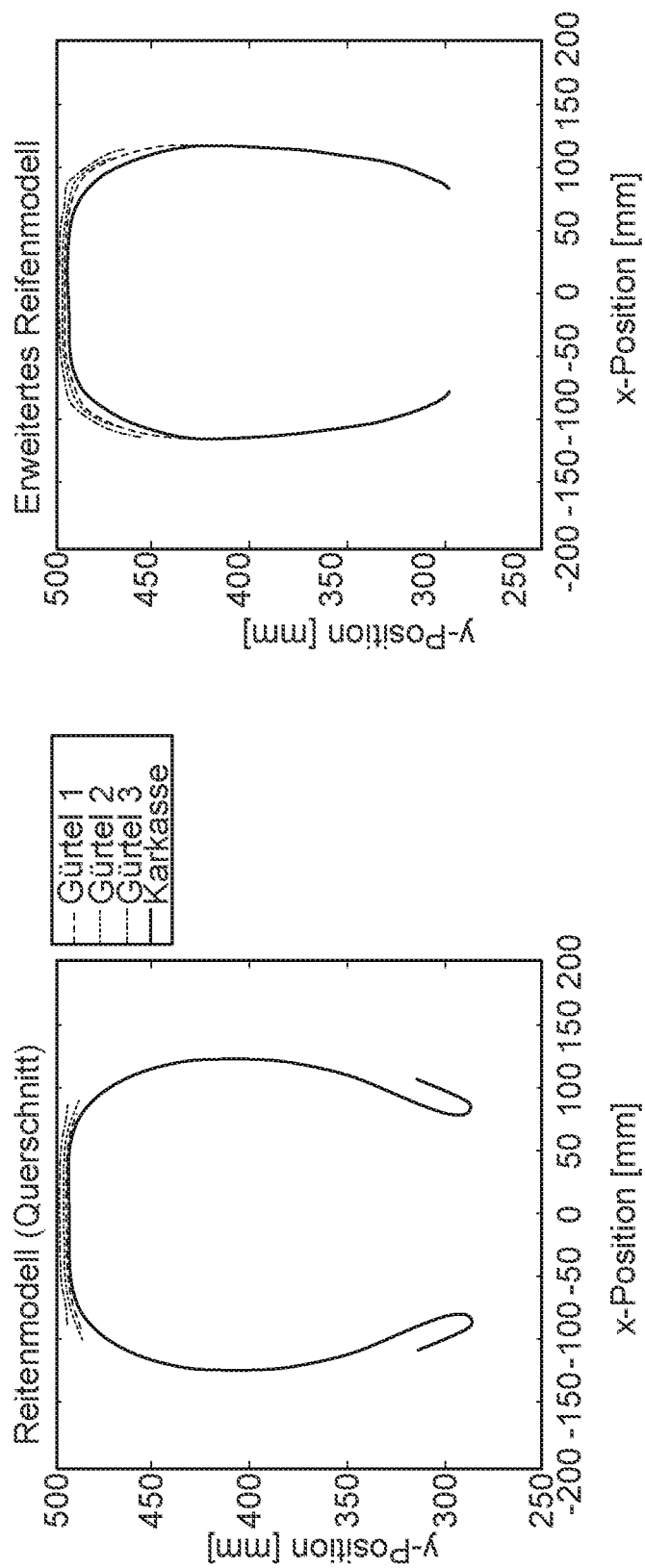

The model is extended by means of a suitable method, such that possible location displacements of the individual components due to production are taken into consideration, see FIG. 6. This results in an extended model function $$\tilde{f}_k: t \in [0, 1] \to (x, r) \in (-\infty, \infty) \times [0, \infty)$$
$$\text{with } f_k(\alpha, t) = (\tilde{f}_k(t), \alpha)$$
$$\text{for } t \in [t_{k,0}, t_{k,1}] \text{ and } \alpha \in [0°, 360°)$$

Figure 7:
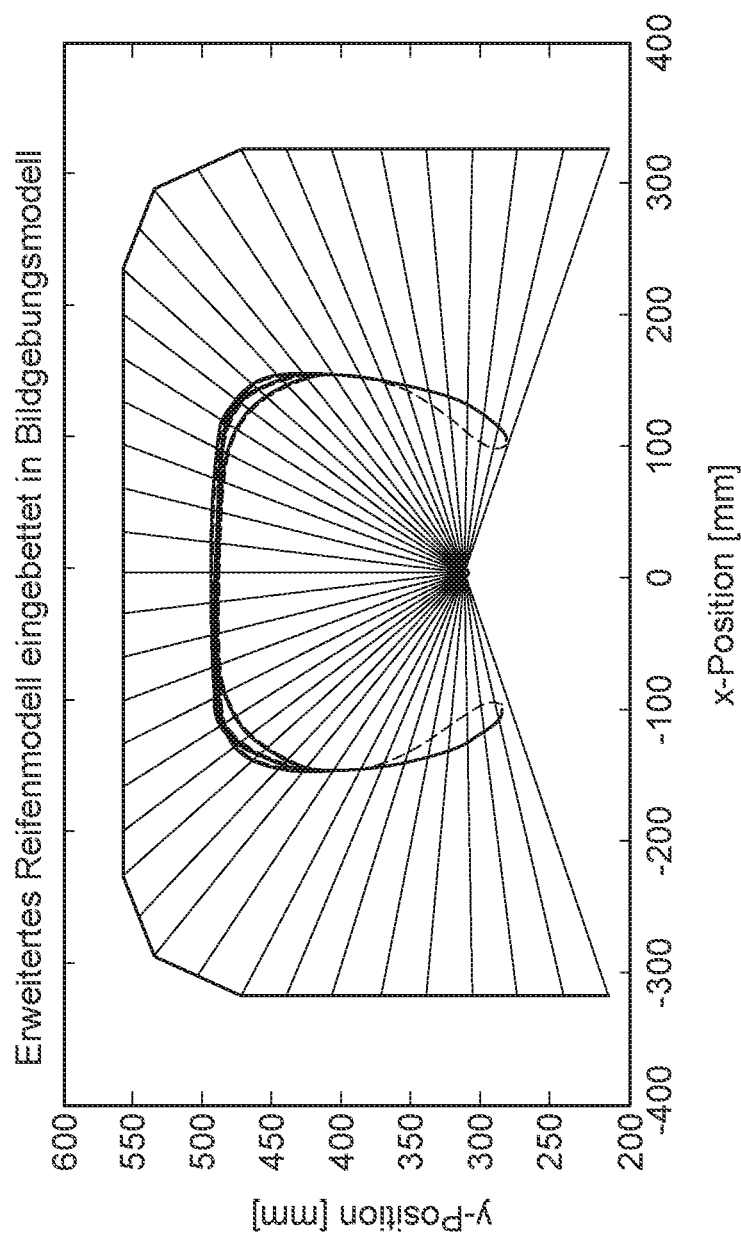

Corresponding to the actual imaging geometry, the extended model is incorporated into the model of the imaging, which contains the position $T \in [0,\infty)^2$ of the X-ray tube 10 and the positions of the detector pixels $L_i \in [0,\infty)^2$, i=1... number of detector pixels, as shown in FIG 7. For each pixel and for each component of the tire model, the preimage $\tilde{f}_k(t_{k,i})$ can now be calculated under the X-ray projection, i.e. the parameter $t_{k,i} \in [0,1]$ is calculated such that $$\tilde{f}_k(t_{k,i}) = T + s \cdot (L - T)$$

for a suitable $s \in [0,\infty)$.

The preimage of a pixel with respect to a model component is the point at which a beam emanating from the X-ray source 10 to this pixel intersects the model component.

For a point P=(m, n) in the X-ray line image with line index m and column index n the associated tire component k is first identified. The preimage $$\tilde{f}_k(t_{k,n}) = (x_{k,n}, r_{k,n})$$

which contains the x-position of the point in the space and the radial distance to the x-axis (the x-axis corresponds to the axis of rotation of the tire 90) is then determined. The line index m is equivalent to the angle position $\alpha_m$ in the tire 90, such that the point $(x_{k,n}, r_{k,n}, \alpha_m)$ in the cylindrical coordinate system results as reconstructed three-dimensional position of P. By means of the coordinate transformation $(x,r,\alpha) \rightarrow (x, r \cdot \cos(\alpha), r \cdot \sin(\alpha))$ the representation in Cartesian coordinates is obtained.

This method can be used for the approximate determination of the position of individual tire components identifiable in the X-ray line image, in that the positions of all pixels representing the component are reconstructed in the space. For assessment of the location of the tire components with respect to each other, the position of the component edges is reconstructed and then measured according to the inspection specification. As a rule, the true values A, represented in FIGS. 2 and 4, of the horizontal distances of interest lie in a range between 5 mm and 50 mm.

In summary it can be stated that the described method according to the invention makes it possible for a point in the X-ray line image, which can be allocated to a component, in particular of a cord 99 or, respectively, a steel belt to which such a cord 99 belongs, of the tire 90, to reconstruct the original three-dimensional position in the tire 90. This results in the possibility of measuring and assessing the location of the tire components in the three-dimensional reconstruction of the tire. For example, it can thus be recognized whether, for two belt edges which are projected onto exactly the same position in the X-ray image, there is a sufficiently great distance in the horizontal direction in relation to the cross-section of the tire, i.e. parallel to the tread of the tire or orthogonal to the effective weight force of the vehicle. Compared with the approaches currently to be found in the application, the described method according to the invention thus makes possible the realization of a significantly larger number of different measurement tasks and at the same time a reduction in the systematic measurement deviation.

The typical measurement tasks include, among others: measuring the horizontal distance between two belt edges, measuring the vertical distance between the ends of ply turn-up and chafer, determining the belt width, i.e. the actual extent of a belt ply along its cross-section, measuring the splice offset of the belt plies, determining the paired distance between the cords of a belt ply.

Measurement tasks a) and b) can be realized by means of the described method; the approaches according to the state of the art currently to be found in the application do not generally make this possible. In the case of measurement tasks c) to e), the described method leads to an increase in the measurement accuracy due to a reduction in the systematic measurement deviation.

LIST OF REFERENCE NUMBERS

1 X-ray inspection system
10 X-ray tube
15 X-ray detector
33 pixel
35 vector
40 calibration plane
90 tire
91 carcass
92 bead core
93 ply turn-up end
94 chafer end
99 element; cord
A true value of the horizontal distance
B value of the horizontal distance in relation to calibration plane

I claim:

1. A method for checking the location of elements in a tire of a tire type, comprising:
   providing an X-ray inspection system, wherein the X-ray inspection system has an X-ray tube, a linear X-ray detector, a manipulator, and a three-dimensional model of the tire of the tire type in which potential locations of elements in the tire are described;
   sequentially rotating the tire about a rotational axis at a predetermined rotational angle in the X-ray inspection system;
   performing line-wise acquisition of a two-dimensional X-ray image of the rotated tire at each predetermined rotational angle, wherein each image pixel of the X-ray image is obtained by a radial projection of the elements of the rotated tire along an X-ray beam from the X-ray tube to the linear X-ray detector; and
   forming a three-dimensional reproduction image of the rotated tire by allocating pixels of an element from the two-dimensional X-ray line image to the three-dimensional model of the tire, wherein an intersection point of a straight line through the X-ray tube with the image pixel from the two-dimensional X-ray line image is assigned with a potential location of the element of the three-dimensional model of the tire as a geometric point in the three-dimensional reproduction image of the rotated tire.

2. The method according to claim 1, wherein a measurement of a distance between two points of the elements of the tire is measured along a curve in the three-dimensional model of the tire.

3. The method according to claim 2, wherein the distance measurement is along a cross-section of a belt ply of the tire or horizontally in a cross-section of the tire.

4. The method according to claim 1, wherein the elements are cords of a belt.

5. The method according to claim 1, wherein representation of an element of the tire in the three-dimensional model includes extrapolating a potential displacement of the element within the tire.

6. The method according to claim 1, wherein the line-wise acquisition of the two-dimensional X-ray line images of the elements of the tire is effected in several positions of the tire, into which the tire is brought with the manipulator.

7. The X-ray inspection system with the X-ray tube, the linear X-ray detector and the manipulator, further having a control device which is equipped to carry out a method for checking the location of elements in a tire according to claim 1.

\* \* \* \* \*